United States Patent [19]

Shibata et al.

[11] Patent Number: 4,900,999

[45] Date of Patent: Feb. 13, 1990

[54] CONTROL SYSTEM FOR RECIPROCATING LINEAR MOTION OR INTERMITTENT MOTION DEVICES

[75] Inventors: Masato Shibata; Yoshitaka Yamane, all of Tokushima, Japan

[73] Assignee: Shikoku Kakoki Co., Ltd., Tokushima, Japan

[21] Appl. No.: 305,683

[22] Filed: Feb. 3, 1989

[30] Foreign Application Priority Data

Feb. 5, 1988 [JP] Japan .................................. 63-26253

[51] Int. Cl.⁴ ............................................ G05B 11/00
[52] U.S. Cl. ................................... 318/687; 318/482; 318/466; 141/1; 141/18
[58] Field of Search ....................... 318/687, 482, 466; 141/1, 18

[56] References Cited

U.S. PATENT DOCUMENTS

| | | | |
|---|---|---|---|
| 3,959,703 | 5/1976 | Rosen | 318/466 X |
| 4,010,594 | 3/1977 | Boyd | 141/1 |
| 4,291,261 | 9/1981 | Johnston | 318/482 |
| 4,592,397 | 6/1986 | Mitzner | 141/18 |
| 4,749,925 | 6/1988 | Wilkins | 318/482 |
| 4,833,384 | 5/1989 | Munro et al. | 318/687 |
| 4,842,026 | 6/1989 | Nordmeyer et al. | 141/1 |

*Primary Examiner*—William M. Shoop, Jr.
*Assistant Examiner*—Saul M. Bergmann
*Attorney, Agent, or Firm*—Armstrong, Nikaido, Marmelstein, Kubovcik & Murray

[57] ABSTRACT

A control system for a reciprocating linear motion or intermittent motion device. The system includes e.g. programmable control for setting an extent of stroke for an operation member of the device, for setting a period of stroke time for the operation member, and a memory for storing therein in the order of addresses items of velocity data at stroke positions at a specified spacing, the items of velocity data being obtained from a predetermined operation member velocity diagram. When the extent of stroke and time are specified by, the velocities of the operation member are determined based on the specified values and the velocity data in the memory, permitting the operation member to perform a stroke motion by the specified amount for the specified time period at the velocities determined.

5 Claims, 6 Drawing Sheets ance between the filling nozzle and the level of the liquid. The liquid-filled container is transferred by the transport device to the next station. These operations are accomplished by the following arrangements.

CONTROL SYSTEM FOR RECIPROCATING LINEAR MOTION OR INTERMITTENT MOTION DEVICES

BACKGROUND OF THE INVENTION

The present invention relates to control systems for reciprocating linear motion devices or intermittent motion devices, for example, to systems for controlling the metering cylinder of a filling device in packaging machines, a lifting device for the containers to be filled with a liquid by the filling device, a transport device for intermittently transporting the liquid-filled containers, etc.

Conventionally, the filling stroke of filling devices is controlled by a cam. A cam is also used for controlling the lift stroke of lifting devices to maintain a constant distance between the filling nozzle and the level of the liquid filled in containers during filling operation. A cam is also used for controlling the transport stroke of transport devices for intermittently transporting the liquid-filled containers to a specified work station, so as to diminish the movement of the liquid.

With conventional control systems wherein a cam is used for an operating member, there arises a need to change the cam when the amount of stroke of the operating member or the velocity thereof is to be altered. Accordingly, various cams must be prepared, while the change of the cam requires a cumbersome procedure.

SUMMARY OF THE INVENTION

The main object of the present invention is to overcome the above problem and to provide a control system for reciprocating linear motion or intermittent motion devices.

The present invention provides a control system for a reciprocating linear motion or intermittent motion device, comprising: a servomotor for driving an operation member of the device; means for setting an amount of stroke for the operation member; means for setting a period of stroke time for the operation member; memory means for storing therein in the order of addresses items of velocity data at stroke positions at a specified spacing, the items of velocity data being obtained from a predetermined operation member velocity diagram; pulse generator means for generating a pulse signal having a period equal to a velocity data reading interval determined by the stroke time set by the stroke time setting means and the number of velocity data items stored in the memory means; means for counting the number of pulses produced by the pulse generating means; means for reading the velocity data from the address in the memory means corresponding to a renewed count obtained by the counting means every time the count is renewed; means for converting the read velocity data to a signal corresponding to a velocity obtained by multiplying the velocity data by a coefficient determined by the amount of stroke set by the stroke amount setting means, the stroke time set by the stroke time setting means and all items of velocity data stored in the memory means; and means for controlling the speed of the servomotor according to the output signal of the converting means.

When an amount of stroke and a period of stroke time are set for the operation member of the reciprocating linear motion or intermittent motion device, the velocity of the operation member is determined from the set values and the velocity data stored in the memory means, and the operation member performs the specified amount of stroke for the specified time at the velocity thus determined.

Accordingly, one of the amount of stroke and the stroke time or both can be easily altered merely by varying the value set by one of the stroke amount setting means and the stroke time setting means or the values set by both means. The velocity characteristics of the operation member can also be altered easily by varying the velocity data in the memory means.

DESCRIPTION OF THE PREFERRED EMBODIMENTS

With reference to the drawings, embodiments of the invention will be described below which are systems for controlling the metering cylinder of a filling device in a packaging machine, a lifting device for the containers to be filled with a liquid by the filling device, and a device for intermittently transporting the containers.

(A) General Construction of the Packaging Machine

With the packaging machine, blanks each in the form of a tube with a closed end and to be made into containers are delivered from mandrels onto the transport device. The blanks are intermittently fed by the transport device to a prefolding station, filing station, forming station and top sealing station in succession. At the prefolding station, folds are formed in the open end portion of each blank for forming the top portion of a container. At the filling station, a fluid food or the like is filled into container blank. At the forming station, the open end portion of the blank is folded. At the top sealing station, the folded end portion is sealed, whereby the container is completed with the contents enclosed therein.

The fluid food or like liquid is filled into the container (blank) by the filling device which has a metering cylinder and a filling nozzle. During the filling operation, the container is lowered by the lifting device to maintain a constant distance between the filling nozzle and the level of the liquid filled in the container and thereby prevent the liquid from splashing.

Figure 1:
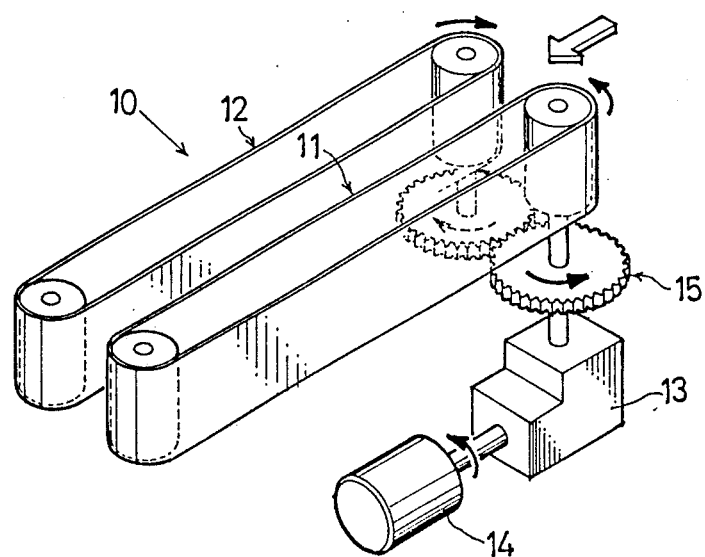
FIG. 1 is a diagram schematically showing a container transport device for use in a packaging machine.

FIG. 1 schematically shows the construction of the transport device 10, which comprises a pair of opposed belt conveyors 11, 12 extending in the direction of transport. Each of the conveyors 11, 12 comprises a pair of front and rear pulleys, and a belt reeved around the pulleys. One of the pulleys of the conveyor 11 has a drive shaft which is coupled by a reduction gear 13 to the output shaft of a servomotor 14 for driving the transport device 10. The rotation of this pulley is transmitted through a gear mechanism 15 to one of the pulleys of the other belt conveyor 12. The servomotor 14 is controlled by the control system shown in FIG. 10.

Figure 2:
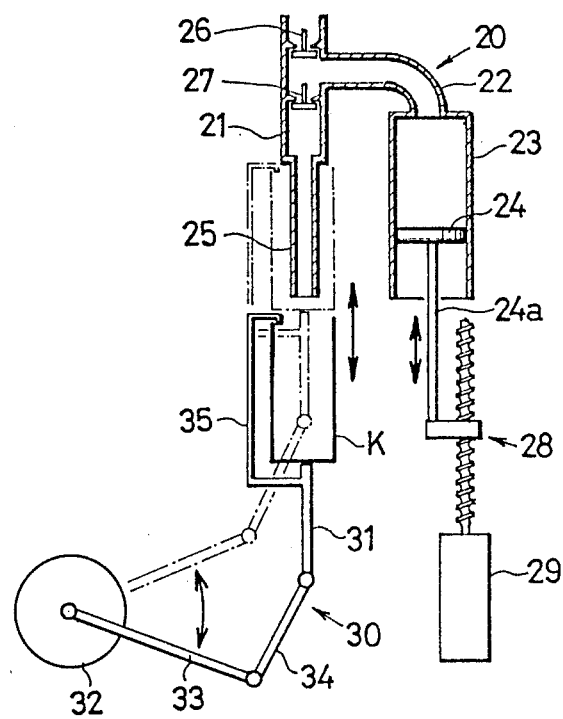
FIG. 2 is a diagram schematically showing a filling device and a container lifting device included in the packaging machine.

FIG. 2 schematically shows the filling device and the container lifting device.

The filling device 20 comprises a filling cylinder 21, a metering cylinder 23 having a piston 24 and connected by a pipe 22 to the filling cylinder 21 at an intermediate portion of its height, and a filling nozzle 25 connected to the lower end of the filling cylinder 21. The filling cylinder 21 is internally provided with check valves 26, 27 at its upper and lower ends, respectively. The upper end of the filling cylinder 21 is connected to a liquid tank by an unillustrated connecting pipe. The rod 24a of the metering cylinder piston 24 is connected by a ball screw 38 to the output shaft of a servomotor 29 for driving the piston for the cylinder 23. The servomotor 29 is controlled by the control system shown in FIG. 4.

The container lifting device 30 comprises a lift member 31 for supporting the container K, a lever 33 reciprocatingly pivotally movable by a servomotor 32, and a link 34 pivoted at its one end to the lower end of the lift member 31 and the other end to the forward end of the lever 33. The lift member 31 has attached thereto a holder 35 for holding the container K with stability. The servomotor 32 is controlled by the control system shown in FIG. 9.

Figure 3:
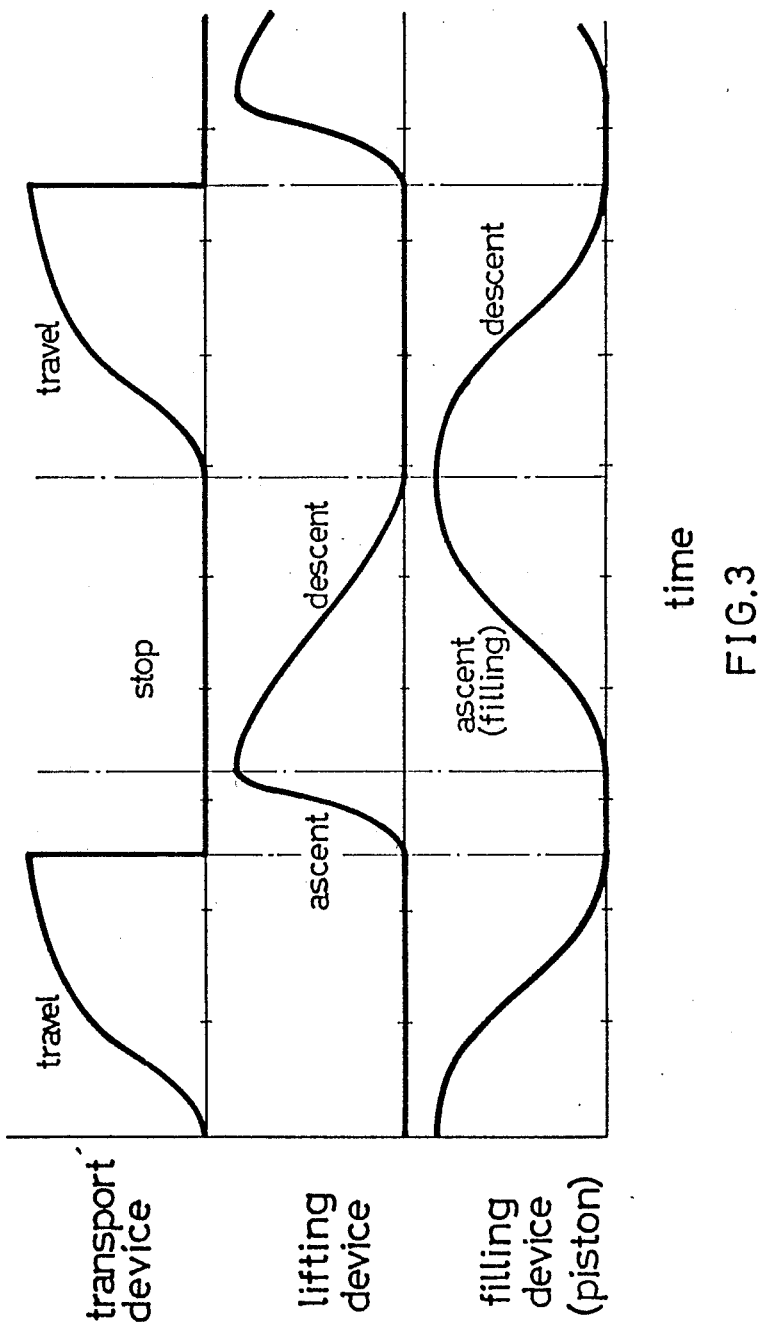
FIG. 3 is a time chart showing the operation of the container transport device, filling device and container lifting device with time.

FIG. 3 shows the operation of the transport device 10, the container lifting device 30 and the filling device 20 with time.

When the transport device 10 stops, the container K is raised from a bottom dead center indicated in a solid line in FIG. 2 to a top dead center indicated in a broken line in the drawing by the lifting device 30. At the top dead center, the filling nozzle 25 is placed in the container K, with the nozzle end positioned at the bottom of the container K.

Upon the container K reaching the top dead center, the piston 24 of the metering cylinder 23 rises, thereby causing the liquid within the cylinder 23 to fill the container K through the connecting pipe 22, the filling cylinder 21 and the nozzle 25. During the filling operation, the lifting device 30 lowers so as to maintain the end of the nozzle 25 at an approximately constant distance from the liquid level in the container K.

On completion of the filling operation, the lifting device 30 stops descending. The transport device 10 is thereafter driven, while the piston 24 of the metering cylinder 23 moves down, allowing the liquid to flow out from the liquid tank into the metering cylinder 23 through the filling cylinder 21 and the connecting pipe 22.

(B) Control of the Metering Cylinder

Figure 4:
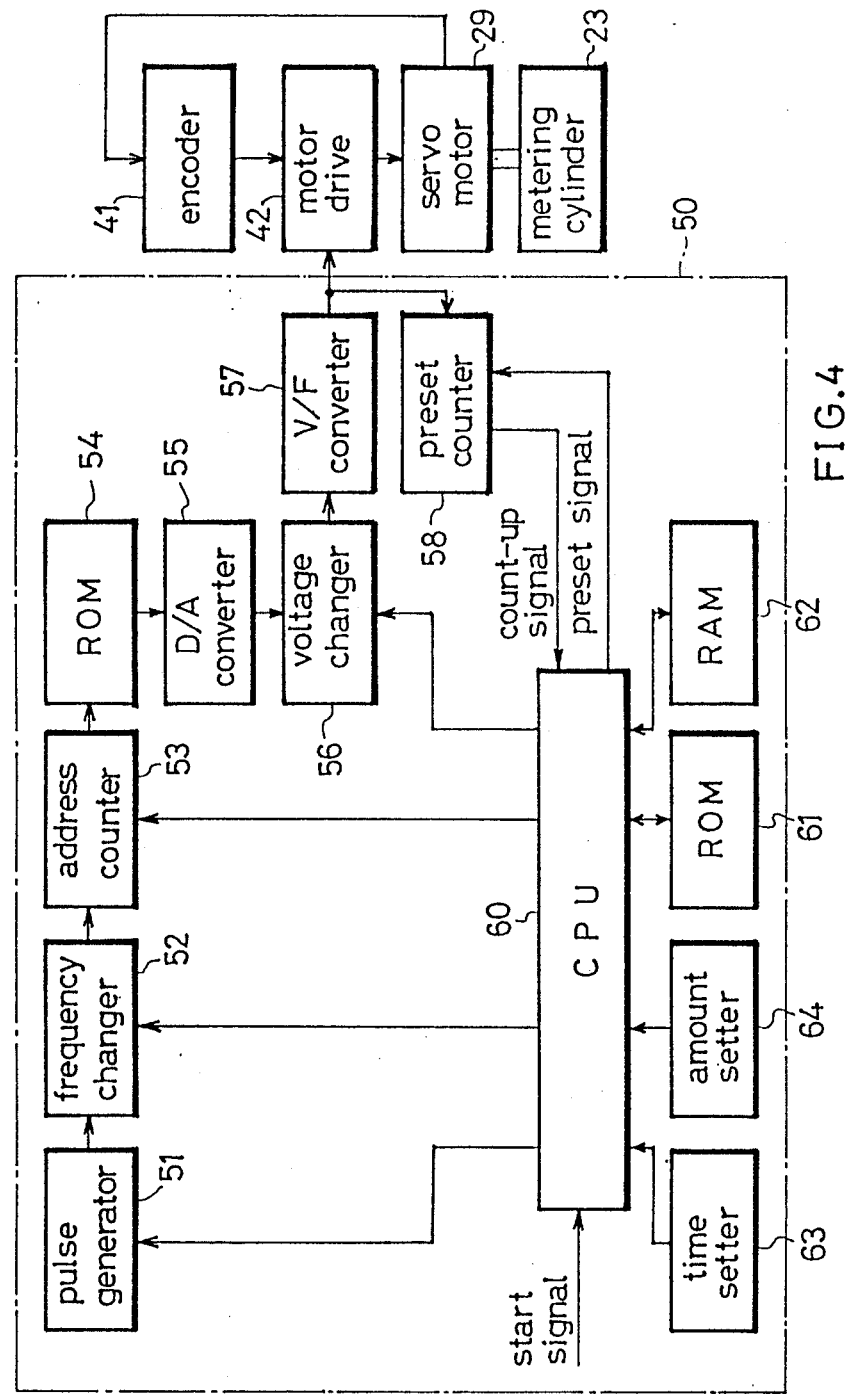
FIG. 4 is a block diagram showing the electrical construction of system for a servomotor for driving a metering cylinder.

FIG. 4 shows the electrical construction of the control system for the metering cylinder driving servomotor. The rotation angular position of the output shaft of the servomotor 29 is detected by an encoder 41, which feeds a detection signal back to a motor drive circuit 42. In response to a pulse signal (motor control signal) sent forward from a motor control circuit 50 and to the detection signal from the encoder 41, the servomotor 29 is subjected to feedback control by the drive circuit 42 so that the rotation angular position of its output shaft coincides with the position represented by the pulse signal.

The motor control circuit 50 comprises a clock pulse generator 51, a frequency changer 52 for changing the pulses produced by the generator 51 to a pulse signal having a frequency f equal to A (first control coefficient) times the frequency fo of the pulses, an address counter 53 for counting the number of pulses produced by the frequency changer 52, a velocity function ROM 54 having stored therein in the order of addresses the desired velocity characteristics data relative to the filling stroke of the metering cylinder 23 or the time required for the filling stroke and delivering the stored data at a particular address specified by the address counter 53, a D/A converter 55 for converting the output data of the ROM 54 to a voltage, a voltage changer 56 for changing the output voltage of the D/A converter 55 to a voltage equal to B (second control coefficient) times the output voltage, a V/F converter 57 for converting the output voltage of the changer 56 to a pulse signal having a frequency in accordance with the voltage value and feeding the pulse signal to the drive circuit 42, a preset counter 58 for counting the number of pulses delivered from the V/F converter 57, and a CPU 60 for controlling these components. The CPU 60 has a ROM 61 having a control program stored therein, and a RAM 62 for storing various items of data.

The CPU 60 receives a setting signal from means 63 for setting a desired period of filling time for the metering cylinder 23, a setting signal from means 64 for setting the desired amount (stroke amount) to be filled by the metering cylinder 23, a count-up signal from the preset counter 58, a start signal forwarded from an unillustrated packaging machine control system at a specified time.

The CPU 60 produces a drive initiation signal and drive termination signal for the clock pulse generator 51, a first control coefficient A setting signal for the frequency changer 52, a reset signal for the address counter 53, a second control coefficient B setting signal for the voltage changer 56, a preset signal for the preset counter 58, etc.

Figure 5:
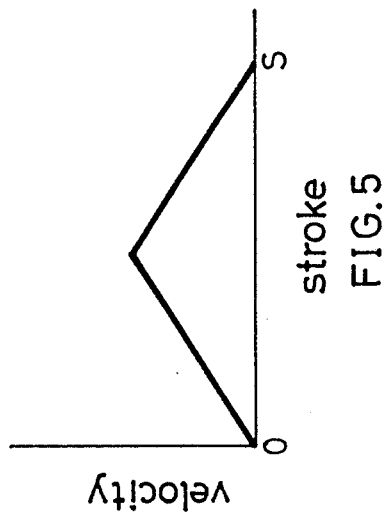
FIG. 5 is a velocity diagram of the piston stroke of the metering cylinder.

FIG. 5 is a velocity diagram showing the relationship between the filling stroke S of the metering cylinder piston 24 and the velocity thereof. Although modified sine curves or the like are usually used for velocity diagrams, an inverted V-shaped line is herein used for the convenience of description.

The velocity function ROM 54 has stored therein in the order of addresses items of velocity data at stroke positions obtained by dividing the filling stroke S by a predetermined number n (e.g., n=4000).

Before the metering cylinder 23 starts a filling operation, the system is initialized first. In the initialization step, the first control coefficient A is determined in the following manner based on the filling time Ts set by the filling time setting means 63 and the velocity data stored in the velocity function ROM 54.

When the filling time is Ts, the interval ds at which the data is read from the ROM 54 is Ts/n. Accordingly the frequency f of reading pulses is n/Ts. Assuming that the clock pulse generator 51 produces pulses with a frequency of fo, $f = A \cdot fo$, so that the first control coefficient A is given by: $A = f/fo = n/(Ts \cdot fo)$.

Further the second control efficient B is determined in the following manner based on the filling time Ts set by the means 63, the filling amount Ws set by the filling amount setting means 64 and the velocity data stored in the ROM 54. With reference to the velocity diagram representing the velocity data stored in the ROM 54, the amount Ws to be filled by the stroke S which requires the time Ts is the product $Sv \cdot Ts/n$ of the sum Sv of the velocities at the respective points of time obtained by dividing the filling time Ts by n, multiplied by the divided time interval Ts/n. Accordingly, the second control coefficient B is given by $B = Ws/Wx = Ws/(Sv \cdot Ts/n)$.

After the system has been thus initialized, the start signal is fed to the CPU 60, whereupon a value (preset value) corresponding to the filling amount Ws set by the setting means 64 is preset in the preset counter 8. The address counter 53 is reset, and the clock pulse generator 51 is thereafter initiated into operation.

The pulse signal produced by the generator 51 is changed by the frequency changer 52 to a pulse signal with a frequency $f = A \cdot fo$. The pulses delivered from the frequency changer 52 are sent to the address counter 53 and counted by counter 53. Every time the count of the address counter 53 is renewed, the velocity data is read from the address of the ROM 54 corresponding to the renewed count and converted to a voltage by the D/A converter 55.

The output voltage of the converter 55 is multiplied by B in the voltage changer 56 and then sent to the V/F converter 57, by which the voltage is converted to a pulse signal with a frequency corresponding to the voltage value. The pulse signal is fed to the motor drive circuit 42, which in turn drives the servomotor 29 at a speed corresponding to the frequency of the pulse signal, whereby the metering cylinder 23 is driven.

The output pulses from the V/F converter 57 are fed also to the preset counter 58 and thereby counted. When the count of the preset counter 58 reaches the preset value, i.e., when the amount of movement of the piston 24 of the metering cylinder 23 becomes equal to the stroke length corresponding to the amount to be filled, the preset counter 58 completes its operation to feed a count-up signal to the CPU 60, whereupon the CPU 60 feeds a drive termination signal to the pulse generator 51 to discontinue the operation of the generator 51 and stop the servomotor 29.

Thus, the piston 24 of the metering cylinder 23 performs the specified amount of stroke corresponding to the specified filling amount for the specified filling time at the velocities determined from the velocity data stored in the ROM 54 and in accordance with the velocity diagram.

Figure 6:
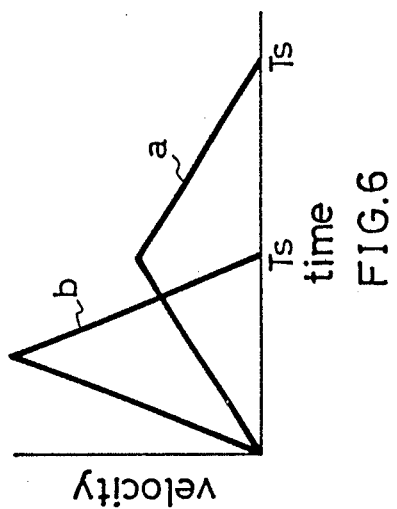
FIG. 6 is an example of velocity diagram wherein the filling time is altered.
Figure 8:
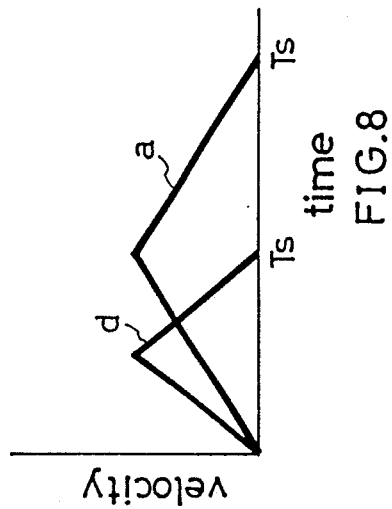
FIG. 8 is an example of velocity diagram wherein the filling time and the amount to be filled are altered
Figure 7:
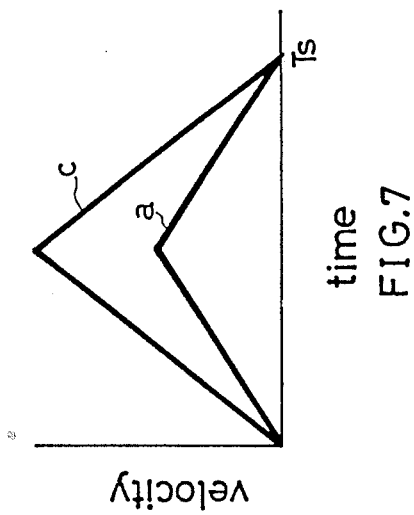
FIG. 7 is an example of velocity diagram wherein the amount to be filled is altered.

For example, it is possible to alter the filling time Ts only with the filling amount unchanged as represented by line b relative to line a in FIG. 6 (the filling amount corresponding to the area inside each flexed line), or to alter the filling amount with the filling time Ts unchanged as represented by line c relative to line a in FIG. 7, or to alter the filling time Ts and the filling amount without changing the velocities at the respective points of time obtained by dividing the filling time Ts by n as represented by line d relative to line a in FIG. 8.

The alteration shown in FIG. 6 is accomplished by varying the value set by the filling time setting means 63. In this case, both the control coefficients A and B are varied. The alteration of FIG. 7 is realized by varying only the value set by the filling amount setting means 64. In this case, the control coefficient B only is altered without changing the coefficient A. The alteration of FIG. 8 can be done by varying the control efficient A only.

Although the speed of the servomotor 29 is controlled by the pulse signal as converted from the output voltage of the voltage changer 56 by the V/F converter 57 in the above embodiment, the motor speed may alternatively be controlled by the output voltage of the voltage changer 56.

Further the detection signal of the encoder 41 is usable for recognizing that the piston of the metering cylinder 23 has moved by an amount corresponding to the set amount to be filled so as to deenergize the pulse generator 51 upon the recognition.

In place of the velocity function ROM 54, it is possible to use other memory, such as ROM 61, having stored therein data as to different velocity diagrams, in combination with a memory adapted for writing and reading, such that the data as to the specified one of the velocity diagrams is transferred from the ROM 61 to the latter memory in the initiation step. This facilitates selective use of one of the different diagrams.

With the above embodiment, the data read from the velocity function ROM 54 is first subjected to D/A conversion, and the resulting voltage value is multiplied by B, whereas the digital velocity data may be multiplied by B before the D/A conversion. Furthermore, the B-fold digital velocity data may be used without D/A conversion for controlling the servomotor 29 according to the B-fold digital value.

(C) Control of Container Lifting Device

Figure 9:
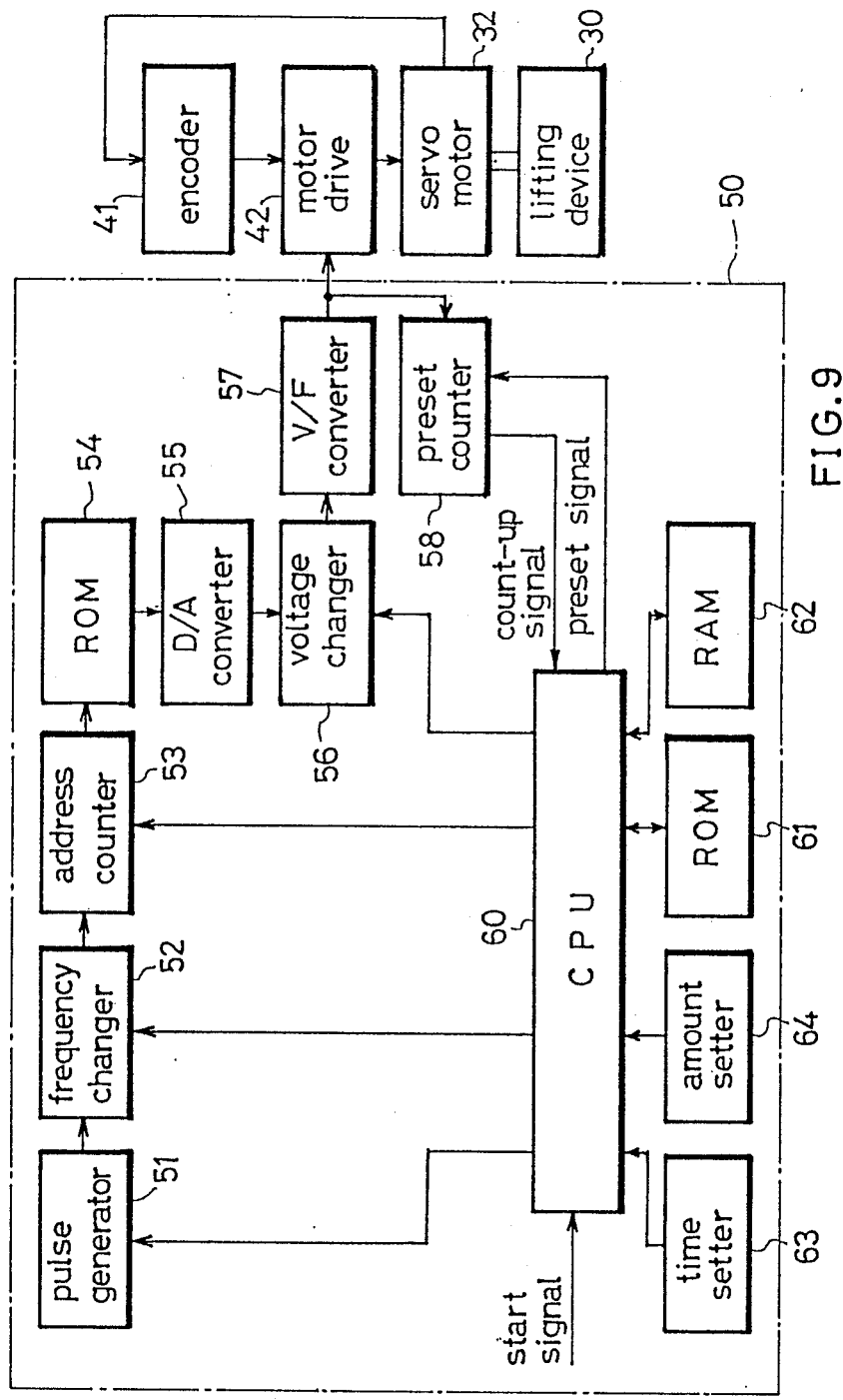
FIG. 9 is a block diagram showing the electrical construction of a control system for a servomotor for driving the contained lifting device.

FIG. 9 shows the electrical construction of the control system for the servomotor 32 for driving the container lifting device. In FIGS. 4 and 9, like parts are designated by like reference numerals, and the difference of the system from the system of FIG. 4 only will be described.

The velocity function ROM 54 has stored therein data as to the desired velocity characteristics of the lift member 31 of the lifting device 30 during its descending stroke (or the time required for the descending stroke), e.g. characteristics represented by the same line as in the velocity diagram of FIG. 5. More specifically, the ROM 54 has stored therein in the order of addresses items of velocity data at the respective stroke positions obtained by dividing the descending stroke S of the lift member 31 by a predetermined number (e.g., n = 4000). Stroke time setting means 63 sets the desired period of time required for the descending stroke of the lift member (hereinafter referred to as "stroke time"). Stroke amount setting means 64 sets a value in accordance with the desired amount of descending stroke of the lift member 31.

The velocity characteristics, stroke time and stroke amount of the lift member 31 involved in its descending stroke are so determined that the end of the filling nozzle 25 is maintained at an approximately constant distance from the liquid level in the container K during the operation of the filling device 20.

A first control coefficient A is given by $A = f/fo = n/(Ts \cdot fo)$ wherein Ts is the stroke time set by the setting means 63, f is the frequency of pulses for reading the velocity data from the velocity function ROM 54, and fo is the frequency of pulses produced by the clock pulse generator 51.

A second control coefficient B is given by $B = Ws/Wx = Ws/(Sv \cdot Ts/n)$ wherein Ts is the stroke time set by the stroke time setting means 63, Ws is the amount of descending stroke set by the descending stroke amount setting means 64, Wx is the amount of descending stroke when the stroke time Ts is required for the descending stroke S in the velocity characteristics corresponding to the velocity data stored in the ROM 54, and Sv is the sum of velocities at the respective points of time obtained by dividing the stroke time Ts by n.

When a start signal is fed to the CPU 60, a value (preset value) corresponding to the descending amount Ws set by the setting means 64 is preset in the preset counter 58. The address counter 53 is reset, and the clock pulse generator 51 is thereafter initiated into operation.

The pulse signal produced by the generator 51 is changed by the frequency changer 52 to a pulse signal with a frequency $f = A \cdot fo$. The pulses delivered from the frequency changer 52 are sent to and counted by the address counter 53. Every time the count of the address counter 53 is renewed, the velocity data is read from the address of the ROM 54 corresponding to the renewed count and converted to a voltage by the D/A converter 55.

The output voltage of the converter 55 is multiplied by B in the voltage changer 56 and then sent to the V/F converter 57, by which the voltage is converted to a pulse signal with a frequency corresponding to the voltage value. The pulse signal is fed to the motor drive circuit 42, which in turn drives the servomotor 32 at a speed corresponding to the frequency of the pulse signal, whereby the lifting device 30 is driven.

The output pulses from the V/F converter 57 are fed also to the preset counter 58 and thereby counted. When the count of the preset counter 58 reaches the preset value, i.e., when the amount of movement of the lift member 31 becomes equal to the stroke length corresponding to the set amount of descending stroke, the preset counter 58 completes its operation to feed a count-up signal to the CPU 60, whereupon the CPU 60 feeds a drive termination signal to the pulse generator 51 to discontinue the operation of the generator 51 and stop the servomotor 32.

Thus, the lift member 31 performs a descending stroke corresponding to the specified amount of descending stroke for the specified period of descending time at the velocities determined from the velocity data stored in the ROM 54.

The control system described automatically controls the container lifting device 30 so that the lift member 31 descends with velocity characteristics in conformity with the predetermined velocity diagram, with the descending stroke time and amount made to equal to the respective set values. During the operation of the filling device 20, therefore, the end of the filling nozzle 25 is maintained at an approximately constant distance from the liquid level within the container K.

Further as is the case with the control system for the metering cylinder driving servomotor shown in FIG. 4, it is possible to alter the stroke time only with the amount of descending stroke (corresponding to the area inside the flexed line) unchanged, to alter the amount of descending stroke with the stroke time unchanged, or to alter the descending stroke time and the amount of descending stroke without changing the velocities at the respective points of time obtained by dividing the descending stroke time by n.

Although the speed of the servomotor 32 is controlled by the pulse signal as converted from the output voltage of the voltage changer 56 by the V/F converter 57 in the above embodiment, the motor speed may alternatively be controlled by the output voltage of the voltage changer 56.

Further the detection signal of the encoder 41 is usable for recognizing that the lift member 31 has moved by an amount corresponding to the set amount of descending stroke so as to deenergize the pulse generator 51 upon the recognition.

In place of the velocity function ROM 54, it is possible to use other memory, such as ROM 61, having stored therein data as to different velocity diagrams, in combination with a memory adapted for writing and reading, such that the data as to the specified one of the velocity diagrams is transferred from the ROM 61 to the latter memory in the initialization step. This facilitates selective use of one of the different diagrams.

With the above embodiment, the data read from the velocity function ROM 54 is first subjected to D/A conversion, and the resulting voltage value is multiplied by B, whereas the digital velocity data may be multiplied by B before the D/A conversion. Furthermore, the B-fold digital velocity data may be used without D/A conversion for controlling the servomotor 32 according to the B-fold digital value.

(D) Control of Container Transport Device

Figure 10:
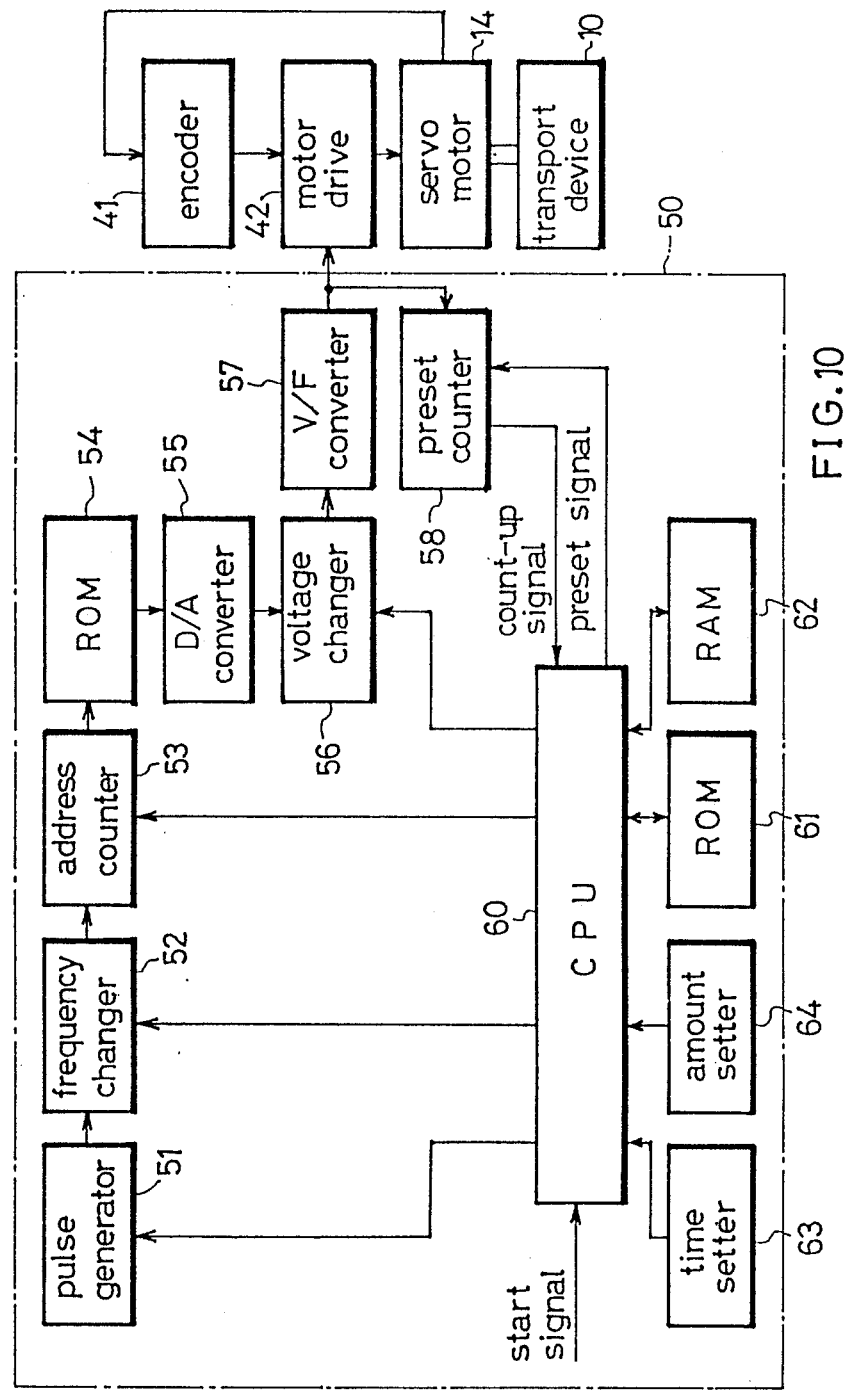
FIG. 10 is a block diagram showing the electrical construction of a control system for a servomotor for driving the container transport device.

FIG. 10 shows the electrical construction of the control system for the servomotor 14 for driving the transport device. In FIGS. 4 and 10, like parts are designated by like reference numerals, and the difference of the system from the system of FIG. 4 only will be described.

The velocity function ROM 54 has stored therein in the order of addresses items of velocity data at the respective stroke positions obtained by dividing the stroke S of intermittent movement of the conveyors 11, 12 of the transport device 10 by a predetermined number (e.g., n=4000). Stroke time setting means 63 sets the desired period of time required for the stroke of the transport device 10 (hereinafter referred to as "stroke time"). Stroke amount setting means 64 sets a value in accordance with the desired amount of stroke of the transport device 10.

The conveyor velocity diagram of the transport device 10, the stroke time and the stroke amount are so determined as to diminish the movement of the liquid in the container K when the container is transported.

A first control coefficient A is given by $A = f/fo = n/(Ts \cdot fo)$ wherein Ts is the stroke time set by the setting means 63, f is the frequency of pulses for reading the velocity data from the velocity function ROM 54, and fo is the frequency of pulses produced by the clock pulse generator 51.

A second control coefficient B is given by $B = Ws/Wx = Wx/(Sv \cdot Ts/n)$ wherein Ts is the stroke time set by the stroke time setting means 63, Ws is the amount of stroke set by the stroke amount setting means 64, Wx is the amount of stroke when the stroke time Ts is required for the stroke S in the velocity characteristics corresponding to the velocity data stored in the ROM 54, and Sv is the sum of velocities at the respective points of time obtained by dividing the stroke time Ts by n.

When a start signal is fed to the CPU 60, a value (preset value) corresponding to the stroke amount Ws set by the setting means 64 is preset in the preset counter 58. The address counter 53 is reset, and the clock pulse generator 51 is thereafter initiated into operation.

The pulse signal produced by the generator 51 is changed by the frequency changer 52 to a pulse signal with a frequency f=A·fo. The pulses delivered from the frequency changer 52 are sent to and counted by the address counter 53. Every time the count of the address counter 53 is renewed, the velocity data is read from the address of the ROM 54 corresponding to the renewed count and converted to a voltage by the D/A converter 55.

The output voltage of the converter 55 is multiplied by B in the voltage changer 56 and then sent to the V/F converter 57, by which the voltage is converted to a pulse signal with a frequency corresponding to the voltage value. The pulse signal is fed to the motor drive circuit 42, which in turn drives the servomotor 14 at a speed corresponding to the frequency of the pulse signal, whereby the transport device 10 is driven.

The output pulses from the V/F converter 57 are fed also to the preset counter 58 and thereby counted. When the count of the preset counter 58 reaches the preset value, i.e., when the amount of travel of the transport device 10 becomes equal to the stroke length corresponding to the set amount of traveling stroke, the preset counter 58 completes its operation to feed a count-up signal to the CPU 60, whereupon the CPU 60 feeds a drive termination signal to the pulse generator 51 to discontinue the operation of the generator 51 and stop the servomotor 14.

Thus, the transport device 10 moves by an amount corresponding to the specified amount of traveling stroke for the specified stroke time at the velocities determined from the velocity data stored in the ROM 54.

Further as is the case with the control system for the metering cylinder driving servomotor shown in FIG. 4, it is possible to alter the stroke time only with the amount of traveling stroke (corresponding to the area inside the flexed line) unchanged, to alter the amount of traveling stroke with the stroke time unchanged, or to alter the traveling stroke time and amount without changing the velocities at the respective points of time obtained by dividing the stroke time by n.

Although the speed of the servomotor 14 is controlled by the pulse signal as converted from the output voltage of the voltage changer 56 by the V/F converter 57 in the above embodiment, the motor speed may alternatively be controlled by the output voltage of the voltage changer 56.

Further the detection signal of the encoder 41 is usable for recognizing that the transport device 10 has moved by an amount corresponding to the set amount of traveling stroke so as to deenergize the pulse generator 51 upon the recognition.

In place of the velocity function ROM 54, it is possible to use other memory, such as ROM 61, having stored therein data as to different velocity diagrams, in combination with a memory adapted for writing and reading, such that the data as to the specified one of the velocity diagrams is transferred from the ROM 61 to the latter memory in the initialization step. This facilitates selective use of one of the difference diagrams.

With the above embodiment, the data read from the velocity function ROM 54 is first subjected to D/A conversion, and the resulting voltage value is multiplied by B, whereas the digital velocity data may be multiplied by B before the D/A conversion. Furthermore, the B-fold digital velocity data may be used without D/A conversion for controlling the servomotor 14 according to the B-fold digital value.

What is claimed is:

1. A control system for a reciprocating linear motion or intermittent motion device comprising:
    a servomotor for driving an operation member of the device,
    means for setting an amount of stroke for the operation member,
    means for setting a period of stroke time for the operation member,
    memory means for storing therein in the order of addresses items of velocity data at stroke positions at a specified spacing, the items of velocity data being obtained from a predetermined operation member velocity diagram,
    pulse generator means for generating a pulse signal having a period equal to a velocity data reading interval determined by the stroke time set by the stroke time setting means and the number of velocity data items stored in the memory means,
    means for counting the number of pulses produced by the pulse generating means,
    means for reading the velocity data from the address in the memory means corresponding to a nenewed count obtained by the counting means every time the count is renewed,
    means for converting the read velocity data to a signal corresponding to a velocity obtained by multiplying the velocity data by a ccefficient determined by the amount of stroke set by the stroke amount setting means, the stroke time set by the stroke time setting means and all items of velocity data stored in the memory means, and
    means for controlling the speed of the servomotor according to the output signal of the converting means.

2. A control system as defined in claim 1 further comprising:
    means for detecting the amount of stroke of the operation member reaching a length corresponding to the stroke amount set by the stroke amount setting means, and
    means for discontining the operation of the servomotor based on the detection by the detecting means.

3. A control system as defined in claim 1 or 2 wherein the reciprocating linear motion or intermittent motion device is a metering cylinder of a filling device.

4. A control system as defined in claim 1 or wherein the reciprocating linear motion or intermittent motion device is a device for lifting containers filled with a liquid by a filling device, and the operation member is a lift member of the lifting device for supporting the container.

5. A control system as defined in claim 1 or 2 wherein the reciprocating linear motion or intermittent motion device is a container transport device, and the operation member is an intermittently driven belt conveyor of the transport device.

* * * * *